US008281490B2

(12) United States Patent
Nishide et al.

(10) Patent No.: US 8,281,490 B2
(45) Date of Patent: Oct. 9, 2012

(54) SPHERICAL BEARING AND PROCESS FOR MANUFACTURING THE SAME

(75) Inventors: Tetsuhiro Nishide, Tokyo (JP); Akira Morokuma, Tokyo (JP)

(73) Assignee: THK Co., Ltd., Tokyo (JP)

( * ) Notice: Subject to any disclaimer, the term of this patent is extended or adjusted under 35 U.S.C. 154(b) by 632 days.

(21) Appl. No.: 12/442,230

(22) PCT Filed: Jul. 31, 2007

(86) PCT No.: PCT/JP2007/064977
§ 371 (c)(1),
(2), (4) Date: Mar. 20, 2009

(87) PCT Pub. No.: WO2008/038458
PCT Pub. Date: Apr. 3, 2008

(65) Prior Publication Data
US 2009/0279820 A1   Nov. 12, 2009

(30) Foreign Application Priority Data

Sep. 27, 2006 (JP) ................................. 2006-262208

(51) Int. Cl.
*B21D 53/10* (2006.01)
(52) U.S. Cl. ......... 29/898.049; 29/898.043; 29/898.047; 29/898.048; 384/203
(58) Field of Classification Search ............... 29/898, 29/898.043, 898.044, 898.045, 898.046, 29/898.049, 898.052, 898.053, 898.12, 898.14, 29/898.047, 898.048; 384/192, 202–204, 384/206
See application file for complete search history.

(56) References Cited

U.S. PATENT DOCUMENTS

| 3,831,244 | A | * | 8/1974 | Amos ....................... 29/898.053 |
| 4,079,490 | A | * | 3/1978 | McCloskey .............. 29/898.047 |
| 5,660,097 | A | * | 8/1997 | Nomura et al. ................. 92/12.2 |
| 6,941,656 | B2 | * | 9/2005 | Michioka et al. ........ 29/898.049 |
| 7,870,673 | B2 | * | 1/2011 | Michioka et al. ........ 29/898.049 |
| 2004/0037621 | A1 | | 2/2004 | Suzuki et al. |
| 2006/0150416 | A1 | | 7/2006 | Michioka et al. |

FOREIGN PATENT DOCUMENTS

JP    59218236  A  *  12/1984

(Continued)

OTHER PUBLICATIONS

Machine Translation of JP2000-074040A; Wada Hiroshi; Mar. 7, 2000.*

(Continued)

*Primary Examiner* — David Bryant
*Assistant Examiner* — Ryan J Walters
(74) *Attorney, Agent, or Firm* — Westerman, Hattori, Daniels & Adrian, LLP

(57) ABSTRACT

Provided are a spherical bearing in which a ball portion (10) of an inside member (1) can be sealed inside an outside member (2) without employment of casting, and the outside member (2) and the inside member (1) are coupled to each other with high strength, and which can be downsized, and a manufacturing method for the same. The spherical bearing includes: an inside member (1) having a metal ball portion (10); a resin liner (3) covering the ball portion (10) of the inside member (1) and held in sliding contact with the ball portion (10); and an outside member (2) molded outside the resin liner (3) by a forging process and held in close contact with an entire of an outer peripheral surface of the resin liner (3) without being brought into contact with the inside member (1), for undetachably enclosing and holding the resin liner (3).

4 Claims, 7 Drawing Sheets

FOREIGN PATENT DOCUMENTS

| | | | |
|---|---|---|---|
| JP | 62-35109 | A | 2/1987 |
| JP | 62-288715 | A | 12/1987 |
| JP | 10-34276 | A | 2/1998 |
| JP | 2000-74040 | A | 3/2000 |
| JP | 2000-110826 | A | 4/2000 |
| JP | 2000-120653 | A | 4/2000 |
| JP | 2002-161911 | A | 6/2002 |
| JP | 2002-266840 | A | 9/2002 |
| JP | 2004-278736 | A | 10/2004 |
| JP | 2004-316771 | A | 11/2004 |
| WO | 2004/092598 | A1 | 10/2004 |

OTHER PUBLICATIONS

Human Translation of JP59218236A; Noriyuki Isoda; Dec. 8, 1984.*
Machine Translation of JP10-034276A; Tokuji Yokoyama; Feb. 10, 1998.*
Notification of Transmittal of Translation of the International Preliminary Report on Patentability (Form PCT/IB/338 of International Application No: PCT/JP2007/064977 mailed May 14, 2009 with forms PCT/IPEA/409.
International Search Report of PCT/JP2007/064977, date of mailing Sep. 18, 2007.

* cited by examiner

SPHERICAL BEARING AND PROCESS FOR MANUFACTURING THE SAME

TECHNICAL FIELD

The present invention relates to a spherical bearing in which an inside member having a ball portion serving as a center of the rocking of a link mechanism and an outside member enclosing and holding the same are rockably or rotatably coupled to each other, and which is primarily used for a link motion mechanism or the like in a stabilizer connecting rod and a tie-rod end of a steering mechanism in an automobile, a blade driving part of a combine, or the like.

BACKGROUND ART

In general, known spherical bearings of this type include bearings which are provided with an inside member having a ball portion and an outside member enclosing and holding the ball portion of the inside member to be coupled to the inside member such that the outside member can rock or rotate relative to the inside member. The outside member must undetachably enclose and hold the ball portion against any load acting on the inside member. Therefore, with such a spherical bearing, there remains a problem of what kind of structure to use for sealing the ball portion in the outside member and for securing free rocking and rotational movements of the inside member and the outside member.

In a well-known structural example of the conventionally adopted spherical bearings, the outside member is formed by casting while the ball portion is formed as a core, whereby the ball portion is directly sealed in the outside member (WO 2004/092598). In this spherical bearing, the bearing steel ball serving as the ball portion is covered with the resin liner by injection molding, and the ball portion is set in the die together with the resin liner. After that, the outside member is formed by die-casting of a zinc alloy or an aluminum alloy. The resin liner is heated to adhere to the cast outside member, and they are integrated with each other. Further, the cast outside member clamps the resin liner with respect to the ball portion of the inside member, and hence the rotation of the ball portion with respect to the resin liner becomes heavier. However, when the resin liner is reheated after casting of the outside member, the contact surface pressure of the ball portion and the resin liner is alleviated, with the contact state thereof being maintained. As a result, the ball portion can be held in sliding contact with the resin liner with a significantly small force.

Meanwhile, in another well-known structural example of the spherical bearings, while the ball portion of the inside member is covered with the bearing seat made of a synthetic resin, the outside member is provided with the housing portion to which the bearing sheet is fit, and the ball portion of the inside member is fitted together with the bearing seat with respect to the housing portion (JP 2000-110826 A, JP 2004-278736 A, and JP 2002-161911 A). In the spherical bearing structured as described above, the bearing seat is fitted to the housing portion of the outside member, and then the clamping process is effected with respect to the opening edge of the housing portion. As a result, the bearing seat is prevented from being detached from the outside member, and the ball portion of the inside member is sealed together with the bearing seat in the housing portion of the outside member.

Patent Document 1: WO 2004/092598
Patent Document 2: JP 2000-110826 A
Patent Document 3: JP 2004-278736 A
Patent Document 4: JP 2002-161911 A

DISCLOSURE OF THE INVENTION

Problems to be Solved by the Invention

However, of those conventional spherical bearings, the spherical bearing in which the outside member is formed by casting has a problem that generation of inner failures during casting cannot be completely prevented, and hence it is necessary to conduct an inspection on all the products for the purpose of uniformizing the qualities thereof. Further, for the same reason, there is also a problem that the spherical bearing cannot be used in important safety components such as suspension components of an automobile.

Meanwhile, in the conventional spherical bearings disclosed in JP 2000-110826 A and the like, the bearing seat covered on the ball portion is fitted to the housing portion of the outside member, and the bearing seat is merely fixed in the housing portion by a clamping process. Thus, there is a problem that the cast outside member has a rated load smaller than that of the above-mentioned spherical bearing which seals the ball portion of the inside member, and hence the spherical bearing is liable to be increased in size under the same load condition. Further, the opening edge of the housing portion is subjected to a clamping process for the purpose of fixing the bearing seat in the housing portion of the outside member. However, when the bearing seat undergoes elastic deformation during the process, the contact surface pressure of the bearing seat with respect to the ball portion is increased. As a result, there arises a problem that a rocking movement and a rotational movement of the inside member with respect to the outside member become heavier. Accordingly, fixation strength of the bearing seat with respect to the outside member is apt to be insufficient, which leads to a problem that the spherical bearing is liable to be increased in size also in terms of securing the fixation strength.

Means for Solving the Problems

The present invention has been made in view of the above-mentioned problems. It is therefore an object of the present invention to provide a spherical bearing in which the ball portion of the inside member can be sealed inside the outside member without employment of casting, the outside member and the inside member are coupled to each other with high strength, and which can be downsized, and provide a manufacturing method for the same.

In order to achieve the above-mentioned object, a spherical bearing of the present invention includes:

an inside member having a metal ball portion;

a resin liner covering the ball portion of the inside member and held in sliding contact with the ball portion; and an outside member molded outside the resin liner by a forging process and held in close contact with an entire of an outer peripheral surface of the resin liner without being brought into contact with the inside member, for undetachably enclosing and holding the resin liner.

In the spherical bearing of the present invention structured as described above, the outside member is molded by a forging process on the outside of the resin liner which is held in sliding contact with the ball portion of the inside member. Specifically, the outside member is molded by die-forging, and the ball portion of the inside member is sealed inside the outside member together with the resin liner at the time of the molding. In the above-mentioned die-forging, the metal bearing element serving as the outside member is arranged in the die, and the bearing element is compressed or impact is applied to thereto, whereby the outside member is molded. In this context, the bearing element flows in the die at the time of impact application and is brought into close contact with the entire region of the outer peripheral surface of the resin liner. Therefore, gaps between the molded outside member and the resin liner are completely eliminated, and both of them are brought into close contact and integrated with each other. With this structure, the ball portion of the inside member covered with the resin liner can be firmly sealed inside the outside member.

At the time of the above-mentioned forging process, the resin liner exists between the outside member and the ball portion of the inside member so as to function as a buffer member for alleviating a pressing force which is transmitted from the outside member to the ball portion and acts thereon. When the resin liner is crushed by the outside member during a forging process and is divided, the outside member is consequently brought into direct contact with the ball portion of the inside member, with the result that the spherical surface of the ball portion is scratched. Therefore, it is important for the resin material constituting the resin liner to be excellent in compressive strength.

Examples of the materials of the outside member include an aluminum alloy, a zinc alloy, a magnesium alloy, carbon steel, alloy steel, and stainless steel, which may be appropriately selected in accordance with mechanical properties necessary for the outside member. Further, when the bearing element made of those materials is formed by a forging process, cold forging, warm forging, or hot forging may by appropriately selected in accordance with condition of the finished surface, mechanical strength, dimensional accuracy, and the like, which are necessary for the outside member. Note that, the inside member covered with the resin liner exists in the hollow portion of the bearing element. Therefore, when the outside member is formed by a forging process, it is necessary to perform the forging process within a temperature range in which performance of the resin liner is not impaired.

Further, in the spherical bearing of the present invention, the outside member formed by a forging process and the resin liner are integrated with each other, and the ball portion of the inside member is held in sliding contact with the resin liner. However, the outside member merely clamps the resin liner toward the ball portion. Thus, when large frictional resistance is effected between the resin liner and the ball portion of the inside member, there is a risk that the resin liner is rotated with respect to the outside member. Accordingly, in terms of reliably preventing the rotation of the resin liner with respect to the outside member, it is preferable that protrusions as rotation stoppers be provided on the outer side of the resin liner such that the outside member which has undergone a forging process is meshed with the protrusions.

Still further, it is sufficient that the resin liner is covered on the ball portion of the inside member prior to a forging process of the outside member. Alternatively, the ball portion may be fitted with respect to the molded ring-shaped resin liner, or the resin liner may be formed by injection molding on the outside of the ball portion as a core. In terms of eliminating the gaps between the spherical surface of the ball portion and the resin liner, the latter method is preferable.

Yet further, in terms of uniformly enclosing and holding the ball portion of the inside member with use of the outside member at the time of a forging process of the outside member, it is preferable that the resin liner be formed to have substantially a uniform thickness, and the outer peripheral surface thereof be formed in a convex-spherical shape which is conformed to the spherical surface of the ball portion.

When the resin liner is formed in the shape as described above, a uniform pressing force is transmitted from the outside member formed by a forging process with respect to the resin liner and the ball portion of the inside member so as to act thereon. As a result, it is possible to reliably eliminate the gaps between those three members, and also to increase a rated load of the inside member.

Meanwhile, when the outside member is forged and brought into close contact with the resin liner during the forging, the outside member consequently presses the resin liner toward the inside member. As a result, immediately after forging of the outside member, the rotation of the ball portion with respect to the resin liner becomes heavier, and hence it is difficult for the inside member to lightly move with respect to the outside member. In order to achieve the light movement of the inside member after a forging process of the outside member, it is effective to adopt a method of heating, through an intermediation of the ball portion of the inside member, the resin liner which covers the ball portion. The resin liner encloses and holds the ball portion, and is held in close contact therewith. Therefore, when the ball portion is heated, the thermal energy thereof is transmitted to the resin liner, and hence the resin liner is heated to a certain temperature. In this case, when the temperature of the resin liner rises and the resin liner is heated approximately to a glass transition temperature Tg, the mechanical strength of the resin liner, such as bending modulus, gradually decreases. Thus, the resin liner is liable to be deformed in a shape conformed to the size of the ball portion. When the resin liner is cooled after the heating, the pressing force transmitted from the outside member to the ball portion through an intermediation of the resin liner is alleviated. Further, the heated ball portion swells, and hence the ball portion yields an effect of expanding the resin liner. Also owing to this, a pressure contact state of the resin liner and the ball portion is apt to be alleviated after cooling of the ball portion. Accordingly, when the resin liner is heated through an intermediation of the ball portion of the inside member after forging of the outside member, the pressure contact state of the resin liner and the ball portion can be alleviated, and hence the ball portion can be smoothly rotated with respect to the resin liner.

In addition, according to the spherical bearing of the present invention as described above, the outside member, the resin liner, and the ball portion of the inside member can be brought into contact with each other without involving gaps therebetween by utilizing a forging process of the outside member. Further, it is possible to completely eliminate backlashes of the ball portion with respect to the outside member. Therefore, even during use over time, a load and a movement can be transmitted between the outside member and the inside member with high accuracy. Above all, the outside member molded by a forging process seals the inside member on the inside thereof, and the outside member, the resin liner, and the ball portion of the inside member are held in close contact with each other without involving gaps therebetween. Therefore, even when the size of the ball portion is the same as that of the conventional spherical bearing, a larger rated load can be set. As a result, the spherical bearing can be downsized under the same load condition.

REFERENCE NUMERALS

1 . . . ball shank (inside member), 2 . . . holder (outside member), 3 . . . resin liner, 10 . . . ball portion

BEST MODE FOR CARRYING OUT THE INVENTION

In the following, a spherical bearing of the present invention is described in detail with reference to the accompanying drawings.

Figure 1:
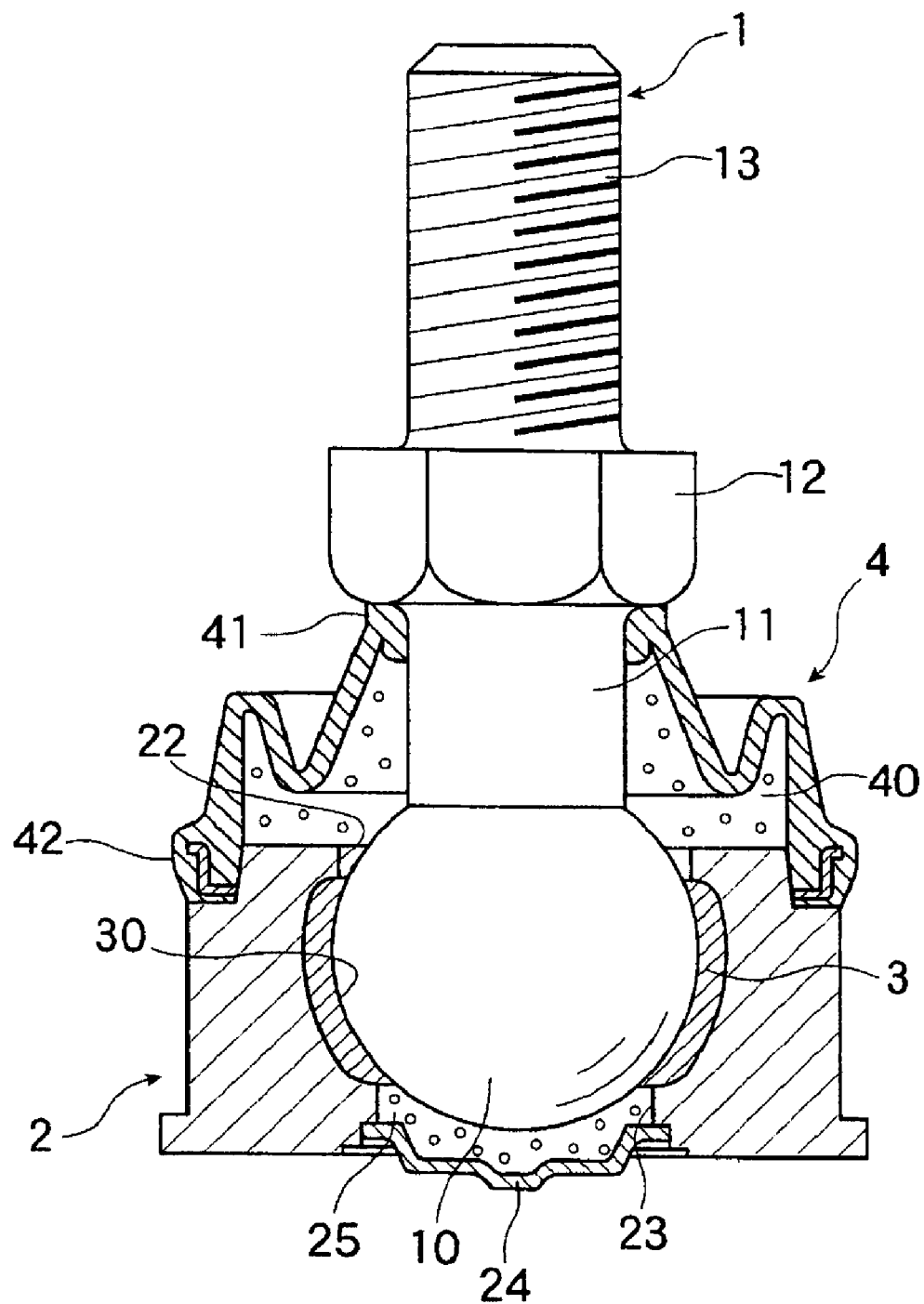
FIG. 1 is a front sectional view illustrating a first embodiment of a spherical bearing to which the present invention is applied.

FIG. 1 illustrates a spherical bearing according to a first embodiment to which the present invention is applied. This spherical bearing is formed of a ball shank 1 constituting an inside member with a ball portion at the distal end thereof, and a holder 2 constituting an outside member enclosing and holding a ball portion 10 of the ball shank 1, with the ball shank 1 and the holder 2 being connected to each other rockably or rotatably.

The ball shank 1 is formed by welding a bar-like shank 11 to a bearing steel ball of high sphericity constituting the ball portion 10, and at the bottom of the shank 11, there is formed a hexagonal bearing surface 12 for fixing an attached body such as a link. Further, a male screw 13 is formed on the distal end of the shank 11, and by threadedly engaging a nut with this male screw 13, the attached body can be held and fixed between the nut and the hexagonal bearing surface 12.

Meanwhile, the holder 2 is formed in a substantially cylindrical shape by die-forging of an aluminum alloy for the purpose of being used while fitting to a through-hole of the attached body such as a link. The holder 2 is embedded with an annular resin liner 3 in a manner of enclosing and holding a spherical surface of the ball portion 10. The ball portion 10 of the ball shank 1 is held in contact only with the resin liner 3. The resin liner 3 has a thickness of approximately 1 mm, and covers approximately two thirds of the spherical surface including the equator of the ball portion 10 such that the ball portion 10 is not detached therefrom. On the inner side of the resin liner 3, there is formed a concave-spherical sliding contact surface 30 which is substantially conformed to the spherical surface of the ball portion 10. Further, the resin liner 3 has an outer peripheral surface formed in a convex-spherical shape which is conformed to the spherical surface of the ball portion 10, and is enclosed and held by the holder in a non-rotatable manner while being held in close contact with the holder 2. With this structure, the ball shank 1 rocks with respect to the ball portion 10 as a center, and is capable of making a rocking movement or a rotational movement with respect to the resin liner 3 which is formed integrally with the holder 2.

Further, in the holder 2, there are formed a pair of openings 22, 23 exposing the ball portion 10 in opposite directions. Further, the shank 11 is bonded to the ball portion 10 through an intermediation of one opening 22, where as a cover member 24 is attached to the other opening 23, and the inner side of the cover member 24 constitutes an oil sump 25. Between the peripheral edges of the openings 22, 23 and the ball portion 10, there is exposed a part of the resin liner 3, and the alloy forming the holder 2 is not held in direct contact with the ball portion 10. Further, the peripheral edges of the openings 22, 23 overlap the end surfaces of the resin liner 3, and the holder 2 firmly holds the resin liner 3.

The inner diameter of each of the openings 22, 23 formed in the holder 2 is slightly smaller than the diameter of the ball portion 10 of the ball shank 1. As described above, the resin liner 3 covers approximately two thirds of the spherical surface including the equator of the ball portion 10, and the resin liner 3 is held by the holder 2, and hence there ought to be no danger of the ball portion 10 being detached from the holder 2. However, when an excessive axial load is applied to the ball shank 1, it is to be imagined that the resin liner 3 is crushed, allowing the ball portion 10 to be detached from the holder 2. In view of this, in order that the ball portion 10 may not be detached from the holder 2 even if the resin liner 3 is crushed, the inner diameter of each of the openings 22, 23 is made slightly smaller than the diameter of the ball portion 10.

Further, between the outer peripheral edge of the holder 2 and the shank 11 of the ball shank 1, there is attached a boot seal 4, preventing intrusion of dust, dirt, etc. into the gap between the ball portion 10 of the ball shank 1 and the opening 22 of the holder 2. Further, there is formed a seal pocket 40 accommodating lubricant such as grease. Here, a ball shank 1 side end portion 41 of the boot seal 4 is held in close contact with the shank 11 due to its elasticity, and a holder 2 side end portion 42 thereof is held between the outer peripheral edge of the holder 2 and a lock ring, and hence the boot seal 4 is not detached by rocking or rotational movement of the ball shank 1.

Next, a method of manufacturing the spherical bearing according to this embodiment is specifically described.

Figure 2:
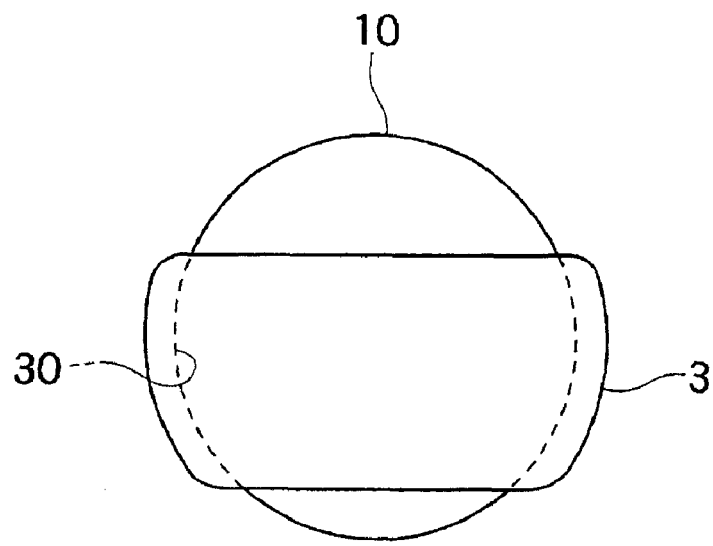
FIG. 2 is a front view illustrating a state in which a resin liner is attached to a ball portion in a manufacturing method for the spherical bearing according to the first embodiment.

As described above, the holder 2 of the spherical bearing in this embodiment is formed by die-forging of an aluminum alloy. In this die-forging, a steel ball serving as the ball portion 10 of the ball shank 1 and the resin liner 3 are accommodated inside the bearing element made of an aluminum alloy, and impact is applied to the bearing element in this state. In this way, the holder 2 is molded. Accordingly, it is necessary first to attach the resin liner 3 with respect to the bearing steel ball serving as the ball portion 10. FIG. 2 is a front view of the resin liner 3 as attached to the steel ball. The resin liner 3 is molded as a ring having an inner diameter in conformity with the outer diameter of the ball portion 10, and is attached to the ball portion 10 so as to cover the equator of the ball portion 10.

As the material of the resin liner 3, there is used a polyether ether ketone exhibiting a glass transition temperature of 151° C. and a melting point of 343° C. (manufactured by Victrex under the trade name of PEEK) and is formed in a thickness of approximately 1.0 mm.

The resin liner 3 is produced by injection molding, in which the ball portion 10 is inserted into a die as a core, and is attached as it is to the ball portion. That is, injection molding of a synthetic resin is effected, with the steel ball serving as the ball portion 10 being inserted into the die, thus performing the molding of the resin liner 3 and the attachment thereof to the ball portion 10 by a single process. When the resin liner 3 is molded in this way, time and effort for attachment thereof to the ball portion 10 is omitted, and in addition, the inner peripheral surface of the resin liner 3 is formed in a concave-spherical shape substantially conformed to the spherical surface of the bearing steel ball of high circularity. As a result, the resin liner 3 can be attached with respect to the ball portion 10 without involving gaps therebetween.

Figure 10:
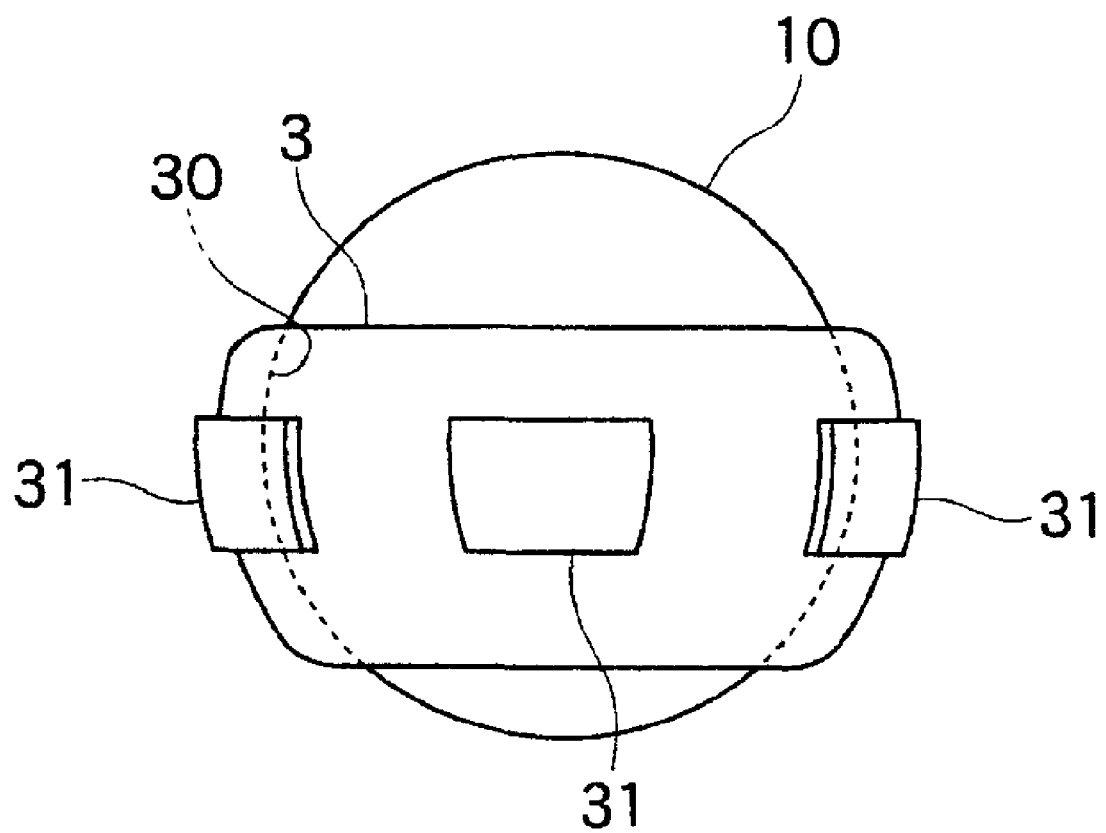
FIG. 10 is a front view illustrating another example of the resin liner attached to the ball portion.

The shape of the above-mentioned resin liner 3 is not limited to that illustrated in FIG. 2. For example, as illustrated in FIG. 10, protrusions 31 may be formed at several portions on the outer peripheral surface of the resin liner 3. As described above, when the protrusions 31 are formed on the outer peripheral surface of the resin liner 3, the protrusions 31 of the resin liner 3 consequently bite into the holder 2 in the case in which the holder 2 is molded by a forging process in the following step. Therefore, it is possible to lock the rotation of the resin liner 3 with respect to the holder 2, and to integrate the holder 2 and the resin liner 3 more firmly with each other.

Figure 3:
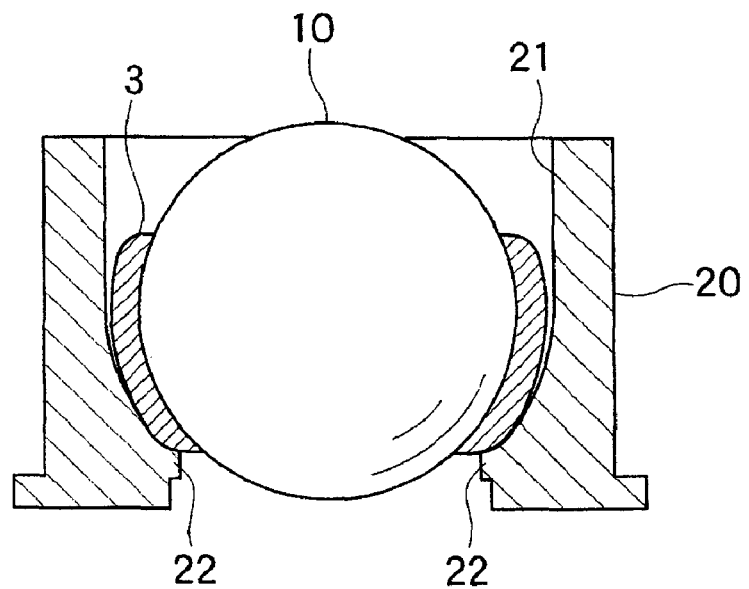
FIG. 3 is a front sectional view illustrating how the ball portion and the resin liner are accommodated in a bearing element made of an aluminum alloy in the manufacturing method for the spherical bearing according to the first embodiment.

Next, when attachment as described above of the resin liner 3 with respect to the bearing steel ball serving as the ball portion 10 is completed, the holder 2 is subsequently formed by die-forging. Regarding this die-forging, first, the bearing element, which is made of an aluminum alloy and formed in the holder 2 by die-forging, is prepared. As illustrated in FIG. 3, the bearing element 20 is formed in a substantially cylindrical shape while having a hollow portion 21 in which the ball portion 10 attached with the above-mentioned resin liner 3 is accommodated. The hollow portion 21 is formed by passing through the bearing element 20. In this context, the ball portion 10 is retained in the hollow portion 21, and hence a step portion 22 for locking the resin liner 3 protrudes to the inner peripheral surface of the hollow portion 21. The step portion is held in contact only with the resin liner 3, and kept out of contact with the ball portion 10.

Note that, in the example illustrated in FIG. 3, the inner peripheral surface of the hollow portion 21 draws a gentle arc continuous with the step portion 22, and exhibits a shape proximate to that of the outer peripheral surface of the resin liner 3. This is obtained as a result of consideration on the flow of the bearing element 20 during die-forging, and the shape of the hollow portion 21 is not limited thereto.

Figure 4:
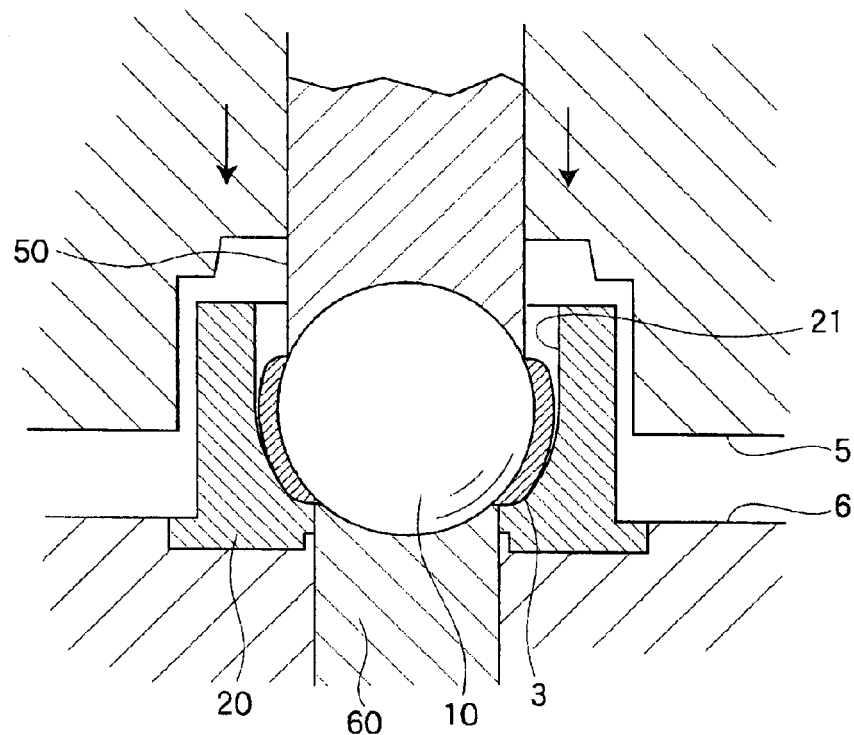
FIG. 4 is a front sectional view illustrating how the ball portion is set in a forging die in the manufacturing method for the spherical bearing according to the first embodiment.

The ball portion 10 and the resin liner 3 are accommodated in the hollow portion 21 of the bearing element 20, and then the bearing element 20 is set in the die so as to undergo forging process. FIG. 4 illustrates a state in which the bearing element 20 is set in the die. The die is constituted by an upper die 5 and a lower die 6, and the bearing element 20 is set in the lower die 6. Further, the upper die 5 and the lower die 6 are respectively provided with slide pins 50 and 60 which cover in advance the spherical surface of the ball portion 10 at the time of a forging process. As a result, the holder 2 molded by a forging process is prevented from being brought into contact with the spherical surface of the ball portion 10. While concave-spherical surfaces which cover the spherical surface of the ball portion 10 are formed at the distal ends of the slide pins 50 and 60, flat surfaces held in contact with the above-mentioned resin liner 3 are formed on the peripheral edges of the concave-spherical surfaces. The ball portion 10 and the resin liner 3 are sandwiched with use of the slide pins 50 and 60 from above and below, whereby the holder 2 molded by a forging process is prevented from being brought into contact with the ball portion 10.

Figure 5:
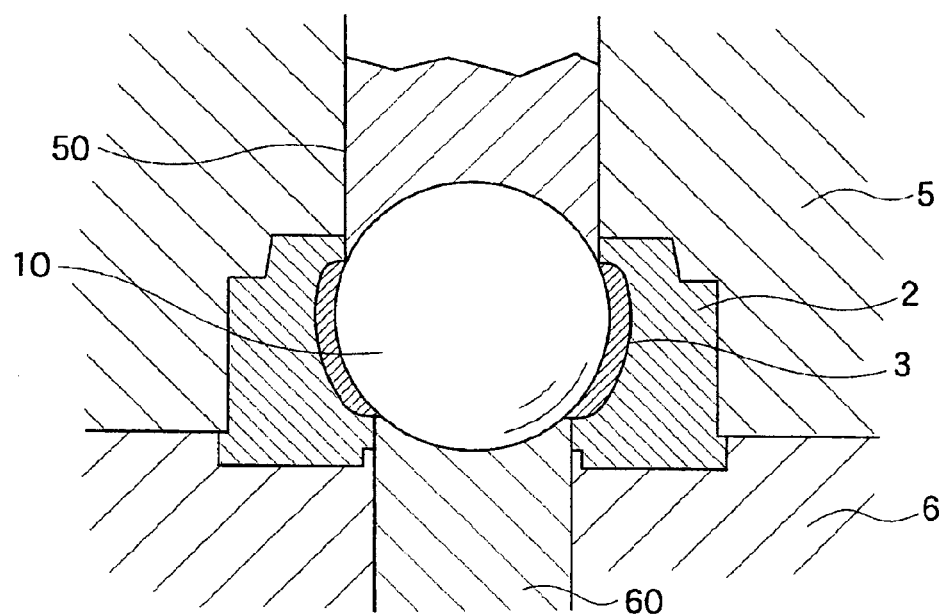
FIG. 5 is a front sectional view illustrating how a holder is forged in the manufacturing method for the spherical bearing according to the first embodiment.

The bearing element 20 is set in the lower die 6, and then the slide pins 50 and 60 are advanced so that the ball portion 10 and the resin liner 3 are sandwiched and held from above and below in the hollow portion 21 of the bearing element 20 (refer to FIG. 4). Next, the upper die 5 is caused to descend toward the lower die 6 in this state so that impact is applied to the bearing element 20, and the upper die 5 and the lower die 6 are clamped to each other as illustrated in FIG. 5. In this way, the holder 2 is molded by die-forging. When the upper die 5 is caused to descend so that impact is applied to the bearing element 20, the bearing element 20 is expanded while being crushed and filled in a cavity formed of the upper die 5 and the lower die 6, thereby being formed in a shape of the holder 2. In this case, the bearing element 20 flows in the cavity, and is brought into close contact with the outer peripheral surface of the resin liner 3 so that the resin liner 3 is pressed toward the ball portion 10. As a result, gaps between the molded holder 2, the resin liner 3, and the ball portion 10 are completely eliminated. Further, as described above, the slide pins 50 and 60 are brought into contact with the ball portion 10 and the resin liner 3, and hence the molded holder 2 does not cover the spherical surface of the ball portion 10. Note that, while being generated as flashes in the abutting surface of the upper die 5 and the lower die 6, surplus portions of the bearing element 20 having overflown from the cavity are cut off after completion of a forging process.

Figure 6:
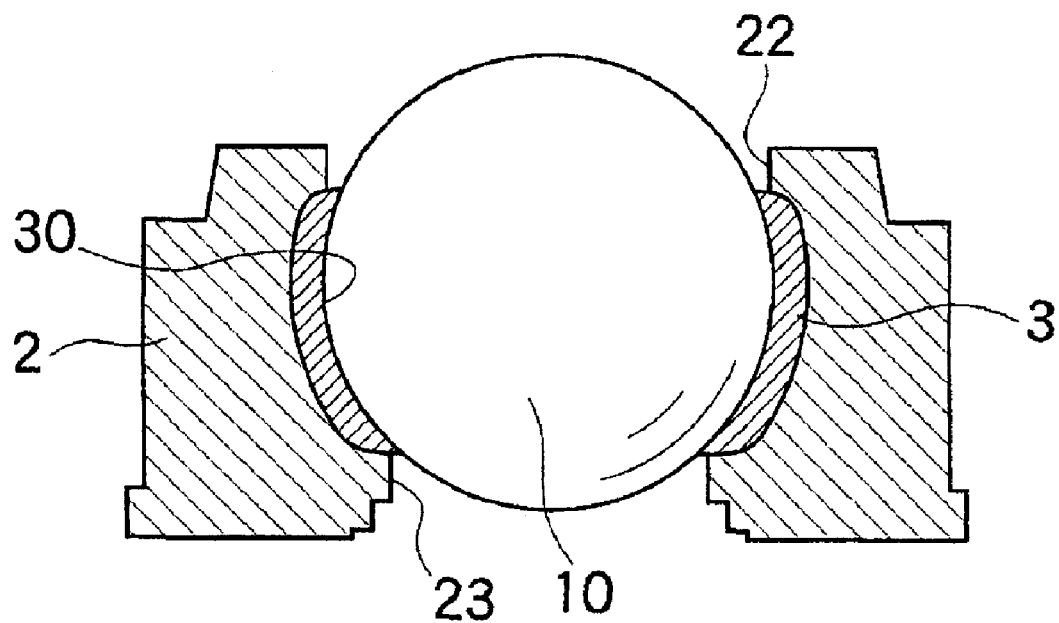
FIG. 6 is a front sectional view of the holder formed by a forging process in the manufacturing method for the spherical bearing according to the first embodiment.

As a result, as illustrated in FIG. 6, the holder 2 with the ball portion 10 and the resin liner 3 enclosed by the aluminum alloy is molded. With this structure, at the positions of the holder 2, which is formed by a forging process, corresponding to the slide pins 50, 60, there are formed the openings 22, 23, and the ball portion 10 is exposed solely through the openings 22, 23. Further, the resin liner 3, which has been attached to the ball portion 10, is embedded to the holder 2 molded by a forging process, and is firmly fixed to the holder 2. The resin liner has been sandwiched from above and below by the slide pins 50, 60, and hence the holder 2 formed by a forging process is not held in contact with the ball portion 10. Further, the holder 2 formed by a forging process overlaps a part of the end surfaces of the resin liner 3, and the holder 2 holds the resin liner 3. As a result, the resin liner 3 is firmly integrated with the holder 2.

Figure 7:
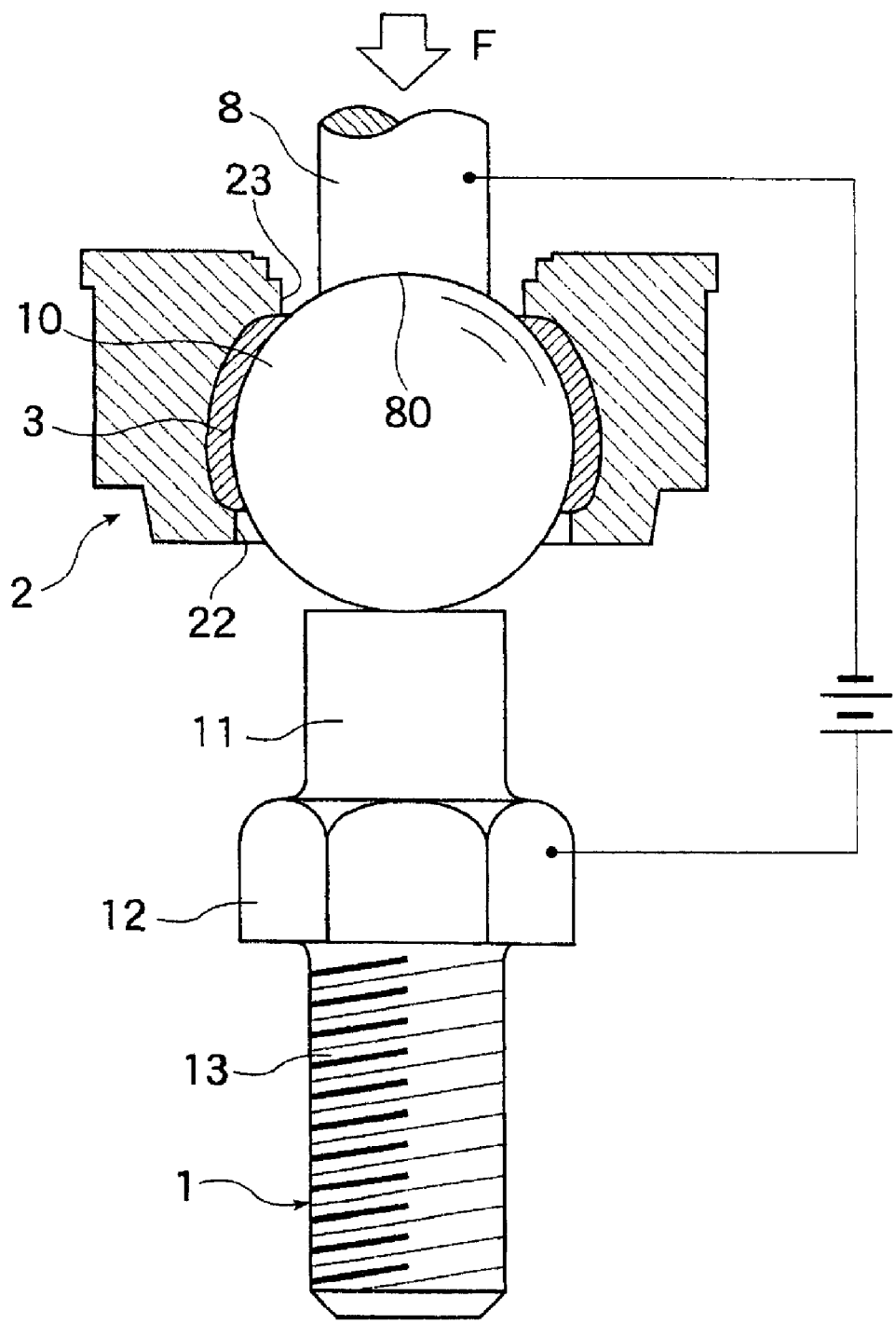
FIG. 7 is a front sectional view illustrating how a shank is welded with respect to the ball portion enclosed and held by the holder in the manufacturing method for the spherical bearing according to the first embodiment.

Next, the shank 11 is welded to the ball portion 10 enclosed and held by the holder 2. For this welding, projection welding is adopted. As illustrated in FIG. 7, the end surface of the shank 11 is brought into press contact, with a predetermined force F, with the spherical surface of the ball portion 10 exposed through the opening 22 of the holder 2, and at the same time, an electrode 8 is brought into contact with the spherical surface of the ball portion 10 exposed through the opening 23, and a welding current is supplied to the shank 11 and the electrode 8 for energization. When a large energization resistance exists between the electrode 8 and the ball portion 10, the portion of the ball portion 10 held in contact with the electrode is melted, and hence the electrode 8 has a concave seat 80 in conformity with the spherical surface of the ball portion 10 for close face contact with the spherical surface of the ball portion 10.

Then, when the projection welding as described above is completed, the ball shank 1 is assembled, with the ball portion 10 thereof being enclosed and held by the holder 2 as illustrated in FIG. 1.

Meanwhile, welding as described above of the shank 11 with respect to the ball portion 10 doubles as an operation of improving the sliding state of the ball portion 10 and the resin liner 3. That is, when the holder 2 is molded by a forging process as described above, an aluminum alloy having flown during the process forcefully presses the resin liner 3 toward the ball portion 10. Thus, there is a risk that high frictional resistance is effected between the ball portion 10 and the resin liner 3 so that it is difficult to rotate the ball portion 10 with respect to the resin liner 3. Actually, when the holder 2 was experimentally produced by a forging process, it was impossible to rotate the ball portion 10 enclosed and held by the holder 2 despite an attempt to make a rotation thereof with the fingers.

However, when the shank 11 is welded to the ball portion 10 as described above, the heat at the time of welding is transmitted to the resin liner through an intermediation of the ball portion. As a result, it is possible to alleviate a pressing force applied from the resin liner 3 to the ball portion 10, and to rock the ball shank with respect to the holder with a smaller force after welding of the shank 11. This is the technique same as that disclosed in WO 2004/092598.

That is, by heating the ball portion 10 after the forging of the holder 2, when the temperature of the resin liner 3, which is held in contact with the ball portion 10, rises to a level not lower than the glass transition temperature Tg, the physical property values of the resin material itself forming the resin liner 3 start to change, and the bending modulus, shearing modulus, etc. gradually decrease, and hence it is possible to deform the resin liner 3 in conformity with the size of the ball portion 10. At this time, the ball portion 10 itself undergoes thermal expansion, and its diameter becomes slightly larger than that at room temperature, and hence the ball portion 10 bulges slightly to expand the resin liner 3. As a result, the force with which the resin liner 3 presses the ball portion 10 is alleviated or canceled, enabling the ball portion 10 to rotate freely relative to the resin liner 3.

When welding the shank 11 to the ball portion 10, the welding portion is heated to a temperature of approximately 1200 to 1500° C., and the resin liner 3, which is held in contact with the ball portion 10, is also heated to a temperature not lower than the glass transition temperature Tg. Thus, when the shank 11 is welded to the ball portion 10 after the casting of the holder 2, the resin liner 3, which has been clamping the ball portion 10, undergoes deformation in conformity with the ball portion 10, making it possible to alleviate or cancel the force with which the resin liner 3 has been pressing the ball portion 10.

At this time, though the ball portion 10 and the resin liner 3 are held in close contact with each other, they are in an ideal contact state involving no generation of stress, and hence the ball shank 1 can perform rocking movement with respect to the ball portion 10 as a center or rotational movement about the axis of the shank 11 very smoothly relative to the holder 2. Further, the gap between the resin liner 3 and the ball portion 10 has been completely eliminated, and hence the ball shank 1 does not rattle with respect to the holder 2, making it possible to sufficiently maintain the performance even in the case of a long-term use.

Then, finally, the above-mentioned boot seal 4 is attached between the shank 10 and the outer peripheral edge of the holder 2, and the seal pocket 40 formed by the boot seal 4 is filled with lubricant such as grease. Further, the above-mentioned cover member 24 is attached to the opening 23 of the holder 2. Thus, the spherical bearing of this embodiment is completed.

Figure 8:
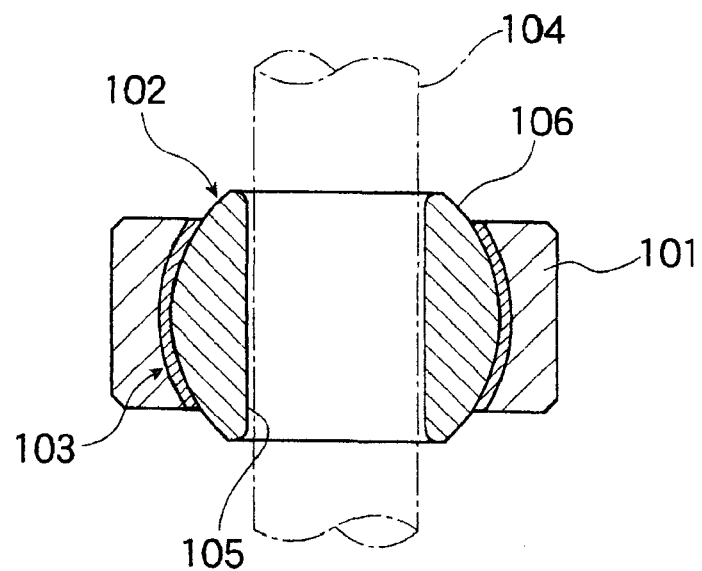
FIG. 8 is a front sectional view illustrating a second embodiment of the spherical bearing to which the present invention is applied.

Next, FIG. 8 is a sectional view of a spherical bearing according a second embodiment manufactured by the method of the present invention.

This spherical bearing is formed of an outer race 101 constituting the outside member, an inner race 102 constituting the inside member, and a resin liner 103 provided between the inner race 102 and the outer race 101, in which the inner race 102 can freely make a rocking movement or a rotational movement relative to the resin liner 103 held by the outer race 101. The inner race 102 is formed in an annular configuration with a through-hole 105 into which a rod 104 of a link mechanism is to be inserted, with its outer peripheral surface 106 being finished as a convex-spherical surface held in sliding contact with the resin liner 103. As the material of the resin liner, the same polyether ether ketone as used in the first embodiment was used, and the thickness thereof was 1.0 mm.

The manufacturing method for the spherical bearing of the second embodiment is substantially the same as the manufacturing method for the spherical bearing of the first embodiment described above. First, the inner race 102 is inserted in a mold as a core, and the resin liner 103 is formed by injection molding, attaching the resin liner 103 to the spherical surface 106 of the inner race 102. Next, the inner race 102 with the resin liner 103 attached thereto is accommodated in the bearing element made of an aluminum alloy, and the outer race 101 is molded by performing die-forging on the bearing element. As a result, there is forged the outer race 101 of the aluminum alloy enclosing the inner race 102. At this time, the outer peripheral surface of the resin liner 103, which has been attached to the inner race 102, is brought into close contact with the forged outer race 101, and is firmly integrated with the outer race 101.

Figure 9:
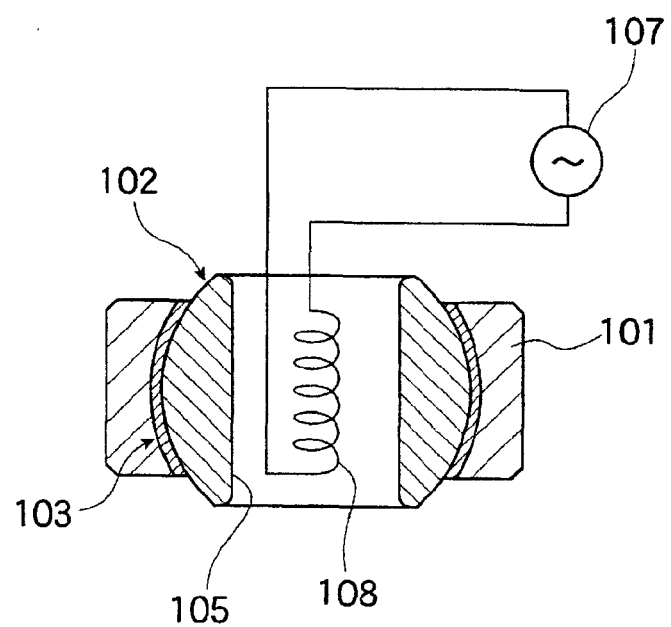
FIG. 9 is a front sectional view illustrating a step of heating an inner race after forging of an outer race in a manufacturing method for the spherical bearing according to the second embodiment.

Further, in order to alleviate or cancel a pressing force with which the resin liner 103 presses the inner race 102 after completion of a forging process, similarly to the manufacturing method according to the first embodiment, it is necessary to heat the resin liner 103 through an intermediation of the inner race 102 after forging of the outer race 101. In the spherical bearing according to the second embodiment, as illustrated in FIG. 9, a coil 108 connected to a high frequency AC source 107 was inserted with respect to the through-hole 105 of the inner race 102, and the inner race 102 was heated from the inside of the through-hole 105 by high-frequency heating. The heating temperature of the inner race ranged from approximately 1500 to 1600° C., and the heating time ranged from approximately 0.2 to 0.5 seconds.

Further, when the inner race 102 is heated as described above, the resin liner 103 held in contact with the inner race 102 is also heated to a temperature equal to or higher than a glass transition temperature Tg. Therefore, the resin liner 103 which has pressed the inner race 102 until then is deformed in conformity with the inner race 102, and hence the pressing force with which the resin liner 103 has pressed the inner race 102 can be alleviated or canceled. As a result, it is possible to freely rotate the inner race 102 with respect to the resin liner 103 integrated with the outer race 101, and to significantly smoothly cause, with respect to the outer race 101, the rod 104 fixed along the through-hole 105 of the inner race 102 to make a rocking movement with respect to the inner race 102 as a center or a rotational movement about the axis thereof.

The invention claimed is:

1. The manufacturing method for a spherical bearing which comprises:
   an inside member having a metal ball portion;
   a resin liner covering the ball portion of the inside member and held in sliding contact with the ball portion; and
   an outside member for undetachably enclosing and holding the resin liner without being brought into contact with the inside member,
   the method comprising:
   molding, by injection molding, the resin liner covering the ball portion, with the ball portion of the inside member being inserted as a core into a die;
   molding, by a forging process, the outside member which is held in close contact with an entire of an outer peripheral surface of the resin liner and kept out of contact with the ball portion, by setting a metal bearing element which has a hollow portion in another die and by accommodating the inside member in the hollow portion, the inside member being formed integrally with the resin liner, the metal bearing element being held in contact only with the resin liner and kept out of contact with the ball portion and wherein the forging process on the outside member is performed in a state in which a spherical surface of the ball portion is covered from above and below by a pair of slide pins which are held in contact with the resin liner; and
   heating, after completion of the forging process, the resin liner through an intermediation of the ball portion of the inside member, the resin liner covering the ball portion.

2. The manufacturing method for a spherical bearing according to claim 1, wherein rotation of the inside member with respect to the resin liner is restricted after the completion of the forging process and prior to the heating of the resin liner.

3. The manufacturing method for a spherical bearing which comprises:
   an inside member having a metal ball portion;
   a resin liner covering the ball portion of the inside member and held in sliding contact with the ball portion; and
   an outside member for undetachably enclosing and holding the resin liner without being brought into contact with the inside member,
   the method comprising:
   molding, by a forging process, the outside member which is held in close contact with an entire of an outer peripheral surface of the resin liner and kept out of contact with the ball portion, by setting a metal bearing element which has a hollow portion in a die and by accommodating the inside member in the hollow portion, the inside member being attached with the resin liner, the metal bearing element being held in contact only with the resin liner and kept out of contact with the ball portion, and wherein the forging process on the outside member is performed in a state in which a spherical surface of the ball portion is covered from above and below by a pair of slide pins which are held in contact with the resin liner; and
   heating, after completion of the forging process, the resin liner through an intermediation of the ball portion of the inside member, the resin liner covering the ball portion.

4. The manufacturing method for a spherical bearing according to claim 3, wherein rotation of the inside member with respect to the resin liner is restricted after the completion of the forging process and prior to the heating of the resin liner.

* * * * *